United States Patent
Gardner, Jr. et al.

(10) Patent No.: US 10,040,135 B2
(45) Date of Patent: Aug. 7, 2018

(54) SYSTEM FOR IDENTIFYING AND DUPLICATING MASTER KEYS

(71) Applicant: Minute Key Inc., Boulder, CO (US)

(72) Inventors: Richard L. Gardner, Jr., Loveland, CO (US); Bradford Shayne Cooley, Escondido, CA (US); David Kortbawi, Escondido, CA (US)

(73) Assignee: MINUTE KEY INC., Boulder, CO (US)

( * ) Notice: Subject to any disclaimer, the term of this patent is extended or adjusted under 35 U.S.C. 154(b) by 20 days.

(21) Appl. No.: 15/191,101

(22) Filed: Jun. 23, 2016

(65) Prior Publication Data

US 2016/0377408 A1    Dec. 29, 2016

Related U.S. Application Data

(60) Provisional application No. 62/185,081, filed on Jun. 26, 2015.

(51) Int. Cl.
  *G01N 21/00* (2006.01)
  *B23C 3/35* (2006.01)
  (Continued)

(52) U.S. Cl.
  CPC .............. *B23C 3/35* (2013.01); *G01B 5/0018* (2013.01); *G01B 21/20* (2013.01)

(58) Field of Classification Search
  CPC .......... B23C 3/35; G01B 5/0018; G01B 5/00; G01B 21/20
  See application file for complete search history.

(56) References Cited

U.S. PATENT DOCUMENTS

| 6,152,662 A * | 11/2000 | Titus | B23C 3/35 409/132 |
| 6,647,308 B1 | 11/2003 | Prejean | |

(Continued)

FOREIGN PATENT DOCUMENTS

DE    102014100393    8/2014

OTHER PUBLICATIONS

International Search Report and Written Opinion dated Nov. 16, 2016 from related/corresponding PCT Patent Appl. No. PCT/US16/39037 filed Jun. 23, 2016.

(Continued)

*Primary Examiner* — Abdullahi Nur
(74) *Attorney, Agent, or Firm* — Jones Day

(57) ABSTRACT

A system for duplicating a master key includes a clamping mechanism for receiving and positioning a master key. The master key defines a major key axis and an intermediate key axis along which a key blade variably extends. The key blade has an upper surface and a minor key axis along a key thickness. A mechanical measurement device includes a probe that deflects along the intermediate key axis during a measurement process. A movement mechanism imparts relative motion along the major key axis between the mechanical measurement device and the master key. The mechanical probe follows the upper surface of the key blade. The mechanical measurement device generates a signal indicative of the deflection of the probe. A processor receives the signal and generates information usable for defining the machining of a duplicate key.

15 Claims, 5 Drawing Sheets

(51) Int. Cl.
*G01B 21/20* (2006.01)
*G01B 5/00* (2006.01)

(56) References Cited

U.S. PATENT DOCUMENTS

| | | |
|---|---|---|
| 8,992,145 B1 | 3/2015 | Mueller et al. |
| 2008/0145163 A1 | 6/2008 | Freeman et al. |
| 2014/0377027 A1 | 12/2014 | Burkett et al. |
| 2015/0050094 A1* | 2/2015 | Gerlings ................ E05B 19/04 409/81 |

OTHER PUBLICATIONS

International Preliminary Report on Patentability & Written Opinion dated Jan. 4, 2018 in International Appl. No. PCT/US2016/039037, filed Jun. 23, 2016.

* cited by examiner

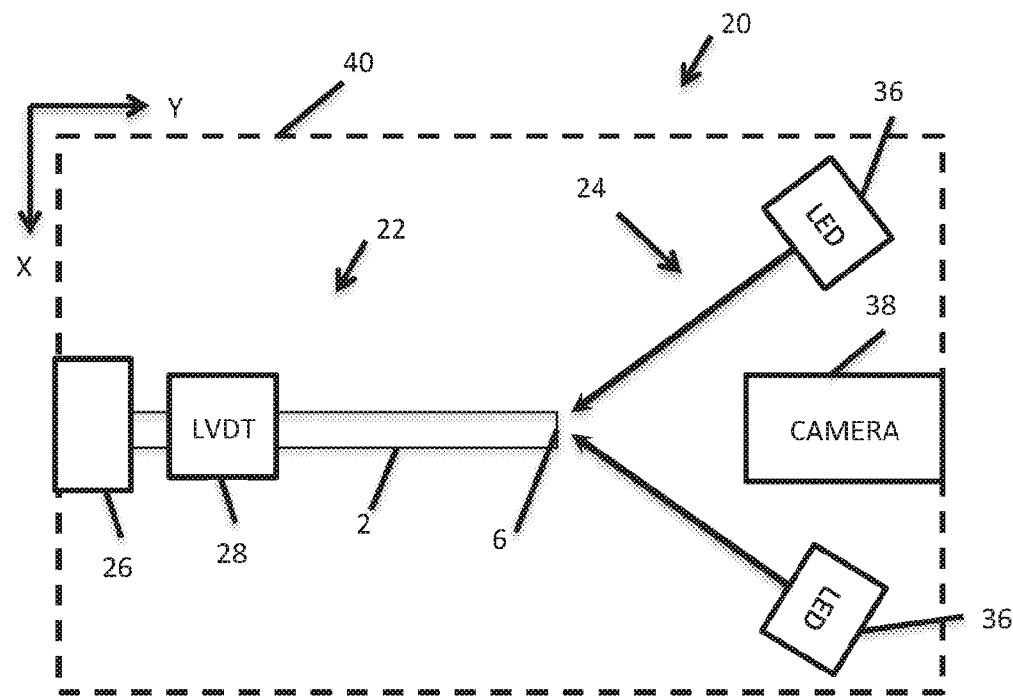
FIG. 2
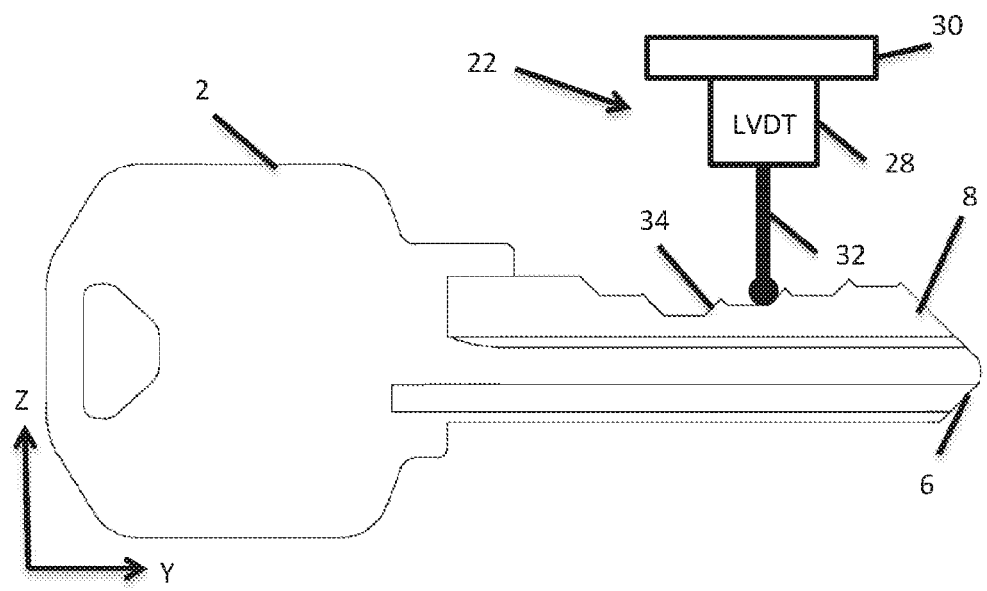
FIG. 3: side view LVDT/bitting

SYSTEM FOR IDENTIFYING AND DUPLICATING MASTER KEYS

CROSS-REFERENCE TO RELATED APPLICATION

This claims the benefit of U.S. Provisional Application No. 62/185,081, filed Jun. 26, 2015, hereby incorporated herein by reference.

TECHNICAL FIELD

This is directed to the field of key duplication, and more specifically to the field of apparatuses and methods of automatically analyzing master keys in an automated and very accurate manner.

BACKGROUND

Various key duplication systems exist for receiving and duplicating a master key. More recent key duplication systems can be automated. Such systems have to perform certain functions.

First, a proper key blank needs to be selected. A typical key blank is characterized factors such as a keyway which is defined by a geometry of a cross-section of a key. An improperly selected key blank will result in an attempted duplicate that cannot be inserted into a lock. Some systems rely on a user to select the proper key blank. This may lead to human error. There is a desire to provide highly reliable automated key blank selection.

Second, the master key needs to be analyzed or traced to obtain the correct "bitting pattern" which defines the shape of a master key blade. An improper determination of the bitting pattern will result in the key not opening a particular lock.

There is an ongoing need to improve the reliability and accuracy of systems that select key blanks and determine bitting patterns for the purpose of key duplication.

SUMMARY

A system and method of the present disclosure provides an accurate and reliable system and method for analyzing a master key. Analyzing the master key includes identifying an optimal key blank and the determining a bitting pattern to be machined into the identified key blank. The master key geometrically defines three mutually orthogonal axes including a major key axis which is the longest axis of the master key, an intermediate key axis along which a key blade variably extends, and a minor key axis along a key thickness. The variable extent of the key blade defines a bitting of the master key. The key blade includes an upper surface having a surface profile that varies along the major key axis and defines the bitting of the master key.

In one aspect of the disclosure a key duplication system includes various major components including the following: (1) a clamping mechanism for receiving and positioning a master key whereby the master key defines a major key axis, an intermediate key axis along which a key blade variably extends, the key blade having an upper surface, and a minor key axis along a key thickness; (2) a mechanical measurement device including a probe that deflects along the intermediate key axis during a measurement process; (3) a movement mechanism that imparts relative motion along the major key axis between the mechanical measurement device and the master key whereby the mechanical probe follows the upper surface of the key blade and the mechanical measurement device generates a signal indicative of the deflection of the probe; and (4) a processor that receives the signal and generates information usable for defining the machining of a duplicate key.

In one implementation the clamping mechanism holds the master key in a fixed stationary location. Thus the relative motion is a result of motion of the mechanical measurement device along the major key axis.

In another implementation the movement mechanism is a moveable stage configured to move linearly along the major key axis. The mechanical measurement device is affixed to the moveable stage whereby linear motion of the moveable stage imparts the relative motion.

In a further implementation the movement mechanism is a moveable stage configured to move linearly along the major key axis. The mechanical measurement device is affixed to the moveable stage whereby linear motion of the moveable stage imparts the relative motion. A camera is attached to the moveable stage and configured to receive an image of a distal end of the master key. The system further includes a computer coupled to the processor and to the camera. The computer utilizes information from the camera to align the movement mechanism along the major key axis.

In yet another implementation the movement mechanism is a moveable stage configured to move linearly along the major key axis. The mechanical measurement device is affixed to the moveable stage whereby linear motion of the moveable stage imparts the relative motion. A camera is attached to the moveable stage and configured to receive an image of a distal end of the master key. The system further includes a computer coupled to the processor and to the camera. The computer receives information from the processor originating from the mechanical measurement device and utilizes this information to align the camera to a distal end of the master key along the major key axis.

In a further implementation the mechanical measurement device includes a linear variable differential transformer (LVDT). An LVDT is a type of electrical transformer used to measure linear displacement and position. The term LVDT sometimes also is referred to as a linear variable displacement transducer or a linear variable displacement transformer.

In another implementation the mechanical measurement device is stationary and the relative motion is imparted by motion of the clamping mechanism along the major key axis.

In another aspect of the disclosure a method for duplicating a master key includes: (1) receiving and clamping a master key defining a major key axis, an intermediate key axis along which a key blade variably extends, and a minor key axis that defines a key thickness; (2) imparting relative motion along the major key axis between a mechanical measurement device with a mechanical probe and the master key whereby the mechanical probe moves along the intermediate key axis while following an upper surface of the key blade; (3) the mechanical measurement device generating a signal indicative of the extension of the key blade along the intermediate key axis; and (4) a processor receiving the signal and generating information usable for defining the machining of a duplicate key.

In one implementation, receiving and clamping the master key includes affixing the master key in a stationary configuration. The relative motion is a result of motion of the mechanical measurement device along the major key axis.

In another implementation, the relative motion is imparted by a moveable stage that supports and transports the mechanical measurement device while moving along the major key axis.

In a further implementation a camera is attached to the moveable stage. In one embodiment the method includes the camera detecting a distal end of the master key to align the mechanical probe to the key blade along the major key axis.

In yet another implementation, a camera is attached to the moveable stage. In one embodiment the method includes computing an alignment of the camera to a distal end of the master key based upon analyzing information from the processor.

In a further aspect of the disclosure a key duplication system includes various major components including the following: (1) a clamping mechanism for receiving and positioning a master key whereby the master key defines a major key axis, an intermediate key axis along which a key blade variably extends, the key blade defining an upper surface, and a minor key axis along a key thickness; (2) an image capture system for generating image information indicative of a keyway geometry for the master key; (3) a mechanical measurement system for mechanically profiling the key blade and generating bitting information for the master key; and (4) a computer that receives information generated by the image capture system and the mechanical measurement mechanism, the computer computes bitting information based upon the information from the mechanical measurement mechanism, the computer selects a proper key blank based at least upon the image information. In one embodiment the computer selects a proper key blank based upon the image information and the bitting information. In another embodiment the computer controls machining of the selected key blank based upon the bitting information.

In one implementation the mechanical measurement system includes a mechanical measurement device including a probe that deflects along the intermediate key axis. In one embodiment the mechanical measurement system includes a movement mechanism that transports the mechanical measurement device along the major key axis whereby the probe follows the upper surface of the key blade, the information received by the computer from the mechanical measurement system is based upon the deflection of the probe over the upper surface.

In another implementation the computer aligns the mechanical measurement system to the master key based upon the information received from the image capture system.

In a further implementation the computer aligns the image capture system to a distal end of the master key based upon the information received from the mechanical measurement system.

BRIEF DESCRIPTION OF THE FIGURES

FIG. 2 is a schematic plan or top view of certain components of a system 20 utilized for analyzing and duplicating a master key.

FIG. 3 is a side view depicting a mechanical measurement device scanning along a major key axis of a master key. During the scanning, a probe follows an upper surface of a key blade.

DETAILED DESCRIPTION

Figure 1A:
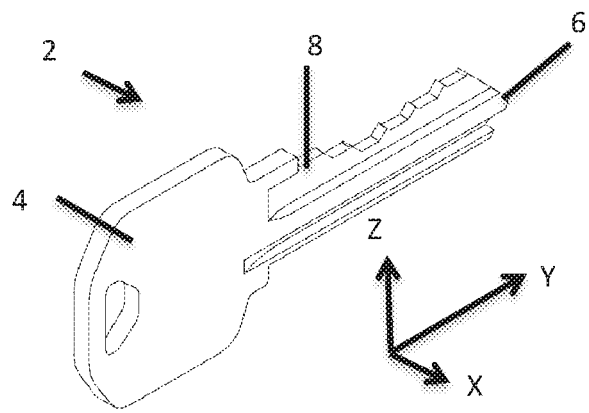
FIG. 1A is an isometric view of an exemplary master key.
Figure 1B:
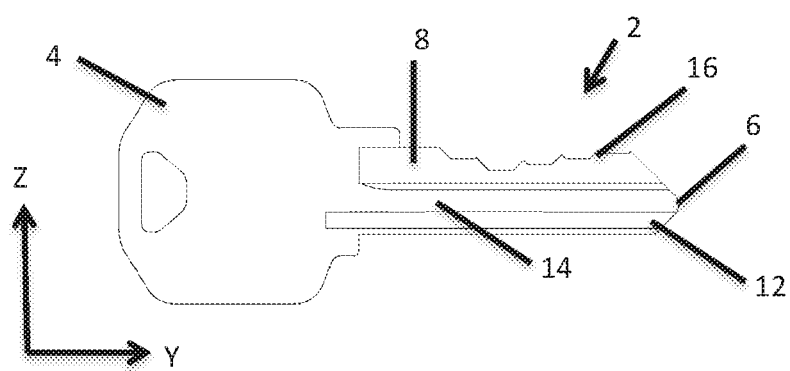
FIG. 1B is a side view of an exemplary master key.
Figure 1C:
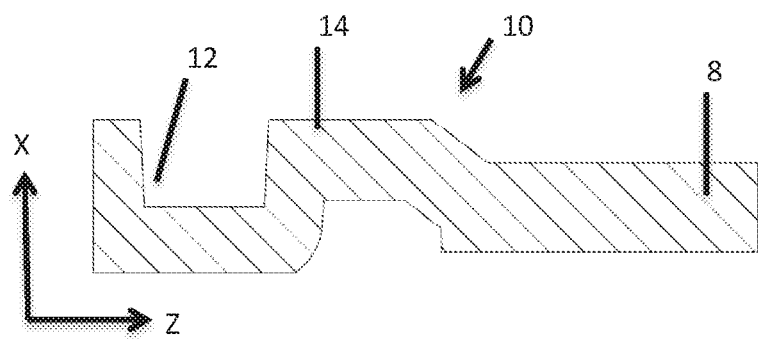
FIG. 1C is a cross sectional view of an exemplary master key illustrating the keyway.

FIGS. 1A, 1B, and 1C are isometric, side, and cross sectional views of an exemplary master key 2 to be analyzed for purposes of duplication. According to this description, a master key 2 is any key that a user or customer desires to duplicate such as a house key, a key to a storage unit, a key to automobile, or any other key that mechanically opens or closes a lock.

To illustrate master key 2, three mutually orthogonal axes X, Y, and Z are defined. Minor key axis X is defined along the thickness of master key 2. Major key axis Y is defined along the longest axis of master key 2. Head 4 and distal end 6 of master key 2 are disposed along major key axis Y. Intermediate key axis Z is the defined as the direction along which key blade 8 variably extends.

Master key 2 is uniquely defined by various factors including a (1) keyway 10, and (2) bittings or teeth formed into key blade 8. Keyway 10 is defined by a cross section 10 of master key 2. The keyway 10 has features such as channels 12 and ridges 14 that allow the master key 2 to slide into a particular lock. The channels 12 and ridges 14 define a variable extent of a portion of key blade 8 along minor key axis X.

Key blade 8 extends variably along intermediate axis Z. The variable extent of key blade 8 defines features such as key teeth 16. The variable extent of key blade 8 defines the bitting of master key 2. The bitting of master key 2 determines which specific lock master key 2 can unlock and lock.

Key blade 8 has an upper surface 34 (FIG. 3) whose dimension Z(surface) along the intermediate key axis Z varies with a position along the major key axis Y. This variation can be referred to as the "surface profile" of upper surface 34 or of key blade 8. The surface profile defines the bitting of master key 2.

FIG. 2 depicts a schematic representation of an exemplary system 20 for analyzing a master key 2 to be duplicated. System 20 utilizes a mechanical measurement mechanism 22 in combination with an image capture system 24 in order to analyze master key 2. Analyzing master key 2 has two parts—(1) identifying a proper key blank and (2) determining the bitting for master key 2. In an exemplary embodiment the system 20 utilizes both the mechanical measurement mechanism 22 and the image capture system 24 in order to determine the proper key blank for master key 2. System 20 uses the mechanical measurement system 22 to determine the bitting for master key 2.

System 20 includes a clamping mechanism 26 for receiving and clamping master key 2. In an exemplary embodiment clamping mechanism 26 is stationary during the use of system 20.

FIG. 3 is a side view schematic illustration that is depicting a master key 2 whose bitting is being measured by mechanical measurement system 22. Mechanical measurement system 22 is configured to measure the bitting on master key 2 utilizing movement along two axes. The two axes include major key axis Y and intermediate key axis Z.

Mechanical measurement system 22 includes a mechanical measurement device 28 that is mounted to a movement mechanism 30.

Mechanical measurement device 28 includes a probe 32 that is configured to deflect along the intermediate key axis Y. As the probe 32 is deflected, mechanical measurement device 28 generates a signal indicative of a magnitude of the deflection. In one embodiment, mechanical measurement device 28 includes a linear variable differential transformer (LVDT) that is an electrical transformer that measures linear displacement of the probe 32.

In one embodiment mechanical measurement device 28 is translated along the major key axis Y during measurement of master key 2 bitting. During measurement the probe 32 follows upper surface 34 of key blade 8. Thus measurement probe 32 moves along two dimensions including major key axis Y and intermediate key axis Z. As measurement probe 32 moves it generates an output signal that is indicative of its movement or displacement along intermediate key axis Z versus time as it translates along major key axis Y. This output signal is used to determine the bitting of master key 2.

Referring back to FIG. 2, the image capture system 24 includes light sources 36 and a camera 38. In an exemplary embodiment light sources 36 are light emitting diodes (LEDs) 36. Light sources 36 are positioned to illuminate a surface of the distal end 6 of master key 2. Camera 38 receives light generally reflected in the +Y direction from distal end 6 to provide an image that represents the keyway 10 (see FIG. 1C). In one embodiment light sources 36 and camera 38 are mounted to moveable stage 40. In another embodiment light sources 36 are fixed and camera 38 is mounted to moveable stage 40.

In an exemplary embodiment system 20 processes the image from camera 38 to generate information characterizing or defining keyway 10 (FIG. 1C). From this information system 20 may determine a proper key blank for duplicating master key 2. In a preferred embodiment system 20 utilizes the information characterizing keyway 10 and the bitting of master key 2 to determine the proper key blank.

In an alternative embodiment the mechanical measurement device 28 is stationary along major key axis Y while clamping mechanism 26 translates along major key axis Y during a process of measuring bitting of master key 2. In this exemplary embodiment the probe 32 only moves along intermediate key axis Z during a measurement of master key 2 bitting. Although probe 32 only moves along intermediate key axis Z it still follows upper surface 34 (FIG. 3) of key blade 8 as the master key 2 is translated along major key axis Y. In this alternative embodiment probe 32 generates an output signal that is indicative of its movement or displacement along intermediate key axis Z versus time. This output signal is used to determine the bitting of master key 2.

Figure 4:
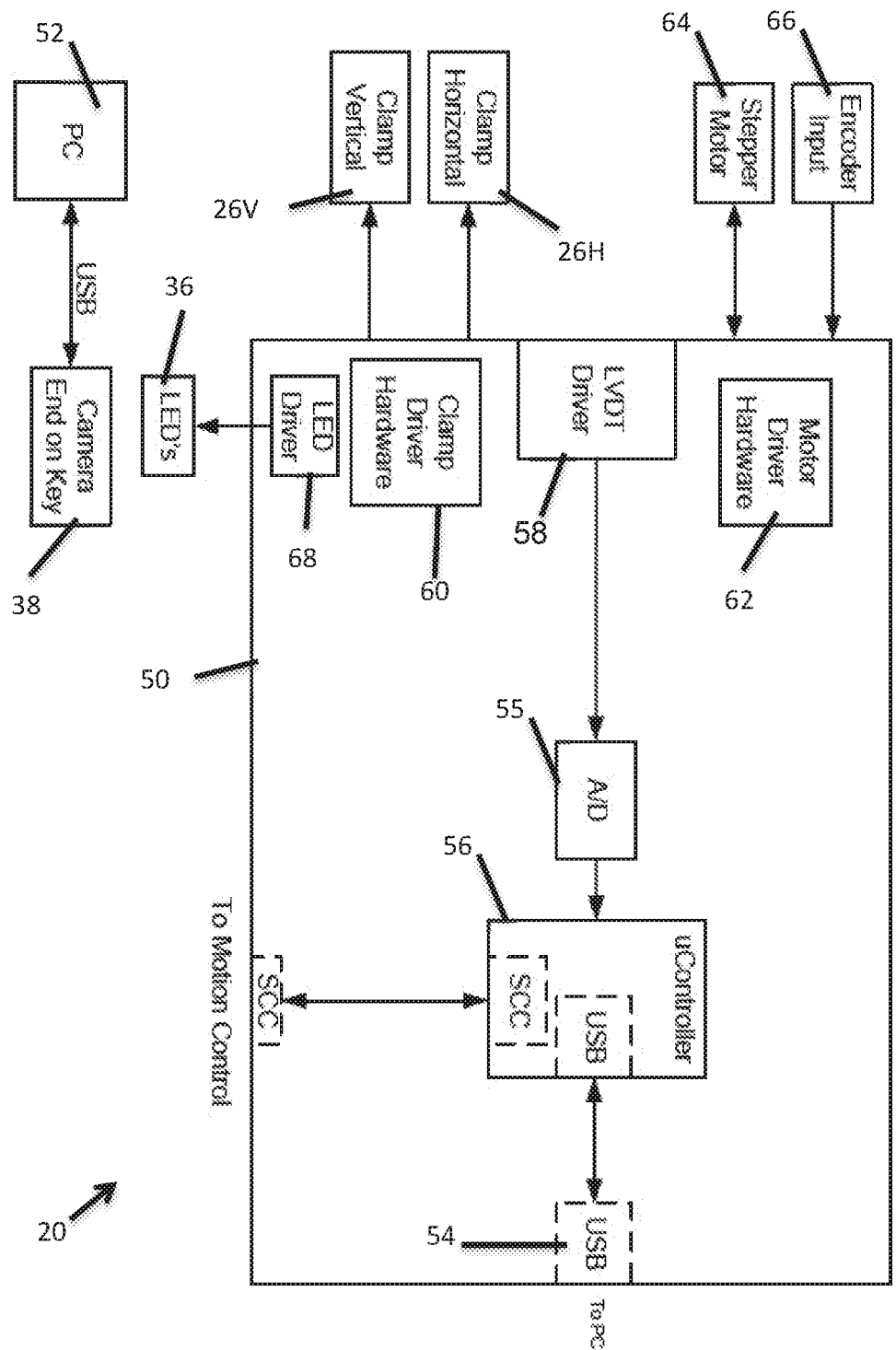
FIG. 4 is an electrical block diagram of an exemplary system for analyzing and duplicating a master key.

FIG. 4 depicts an exemplary electrical block diagram of circuitry and various components of the system 20 previously described with respect to FIGS. 2 and 3. It is to be understood that certain components of FIG. 4 have interconnections that for purposes of simplicity are not illustrated. System 20 includes a main PCBA 50 (printed circuit board assembly) that is interconnected to various system components and to computer 52. Communication between PCBA 50 and computer 50 is accomplished via a universal serial bus (USB) port 54. Computer 52 sends control commands to PCBA 50 and receives data from PCBA 50 that is usable to determine a proper key blank and for machining key blade 8 to provide a duplicate of master key 2.

PCBA 50 includes a LVDT driver 58 that generates a signal based upon the deflection of probe 32. The signal from LVDT driver 58 is digitized by A/D converter 55 and then passed to microcontroller 56. Microcontroller 56 processes the signal and sends information to computer 52 that is indicative of the height of key blade 8 along intermediate key blade axis Z versus time or displacement via the USB port 54.

PCBA 50 includes a clamp driver 60 for operating clamping mechanism 26 (FIG. 2). In the illustrative embodiment clamping mechanism 26 includes vertical clamp 26V and horizontal clamp 26H for clamping master key 2.

PCBA 50 includes a motor driver 62 for controlling a stepper motor 64 for translating movement mechanism 30 along major key axis Y. Motor driver receives positional feedback from encoder 66.

PCBA 50 includes an LED driver 68 for driving LEDs 36 for illuminating the distal end 6 of master key 2. Camera 38 provides information to computer 52 that is indicative of an end image received from distal end 6 of master key 2.

Figure 5:
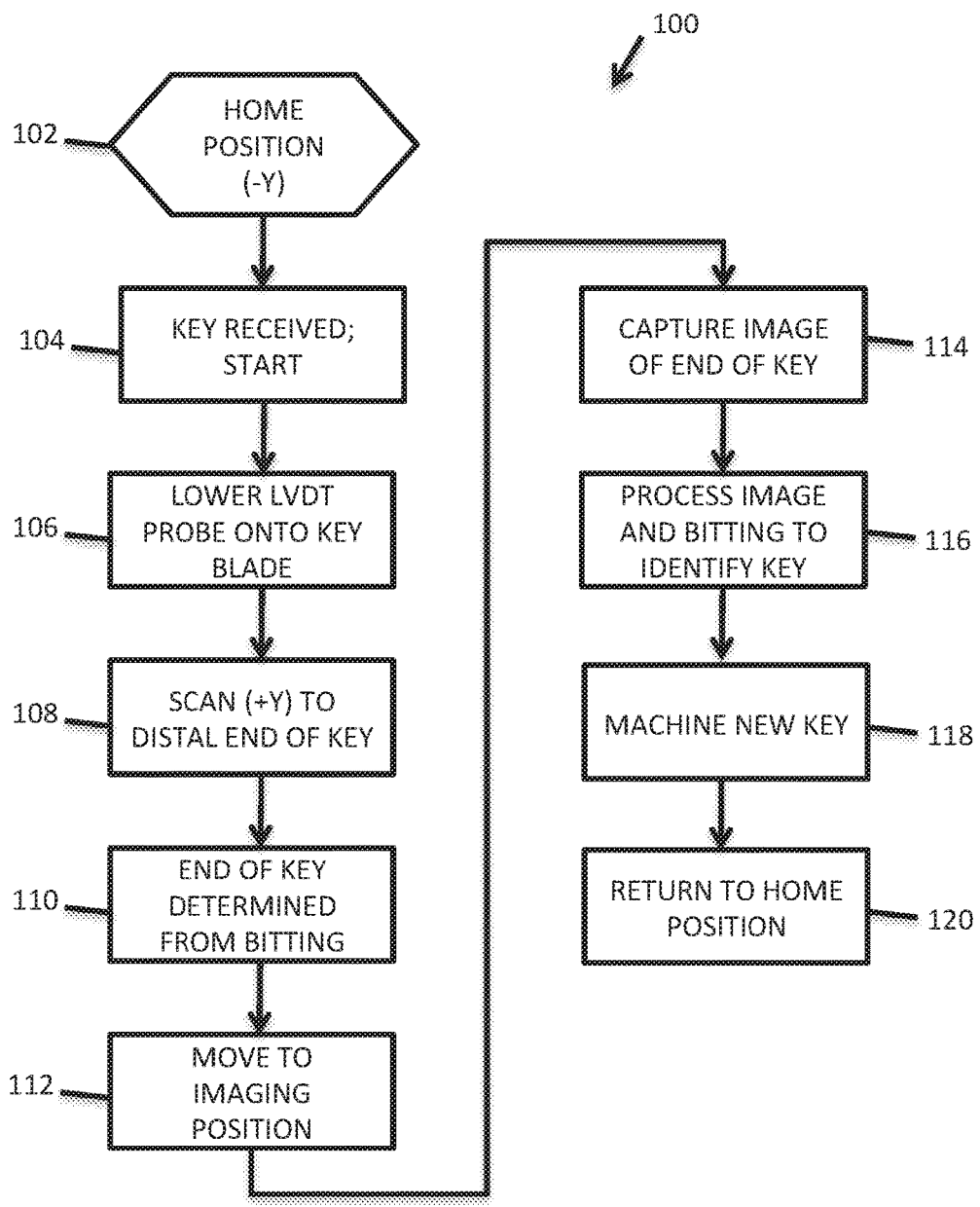
FIG. 5 is a flowchart representation of an exemplary embodiment of a method for duplicating a master key.

FIG. 5 is a flowchart depicting an exemplary process 100 for providing a duplicate of master key 2. For this exemplary embodiment the system 20 described with respect to FIGS. 2, 3, and 4 is utilized.

According to initial condition 102 the mechanical measurement device 28 is at a home position which is as far to the −Y position as possible. According to step 104, a master key 2 is received in clamping mechanism 26 and the process 100 is started. Also according to step 104 the master key 2 is clamped by clamping mechanism 26.

According to step 106 the probe 32 is lowered along intermediate key axis Z and into engagement with the upper surface 34 of key blade 8. According to step 108 the mechanical measurement device 28 is moved along major key axis Y in the +Y direction from near the head 4 toward the distal end 6 of master key 2. As the mechanical measurement device 28 moves in the +Y direction the probe 32 follows the profile of upper surface 34 of key blade 8 as is illustrated in FIG. 3. Thus probe 32 deflects along the intermediate key axis Z in response to variations in the Z coordinate of upper surface 34 of key blade 8. The mechanical measurement device 28 generates a signal indicative of the probe 32 deflection. The signal is digitized and sent to the microcontroller 56 (FIG. 4). The microcontroller 56 processes the signal and sends information to computer 52 indicative of the bitting of master key 2.

According to step 110 the mechanical measurement device 28 passes the distal end 6 of the master key 2. As the distal end 6 is passed the probe 32 remains at a maximum extension in the −Z direction. System 20 utilizes this information to determine the Y coordinate of the distal end. This allows system 20 to determine an imaging position for camera 38.

According to step 112 the system 20 uses the Y coordinate of distal end 6 to determine the proper positioning of camera 38 to focus on the distal end 6 of master key 2. Also according to step 112 the camera 38 is moved into the position for focusing on distal end 6.

According to step 114 camera 38 captures an image of the distal end 6 of master key 2. According to step 116 the image of distal end 6 and the bitting information (captured in step 108) are used to determine and enable a selection of a proper key blank. According to step 118 the selected key blank is machined using the bitting determined from step 108.

According to step 120 the master key 2 is released and removed from clamping mechanism 26. Also as part of step 120 the mechanical measurement device 28 is moved in the −Y direction and back to the home position according to initial condition 102.

Figure 6:
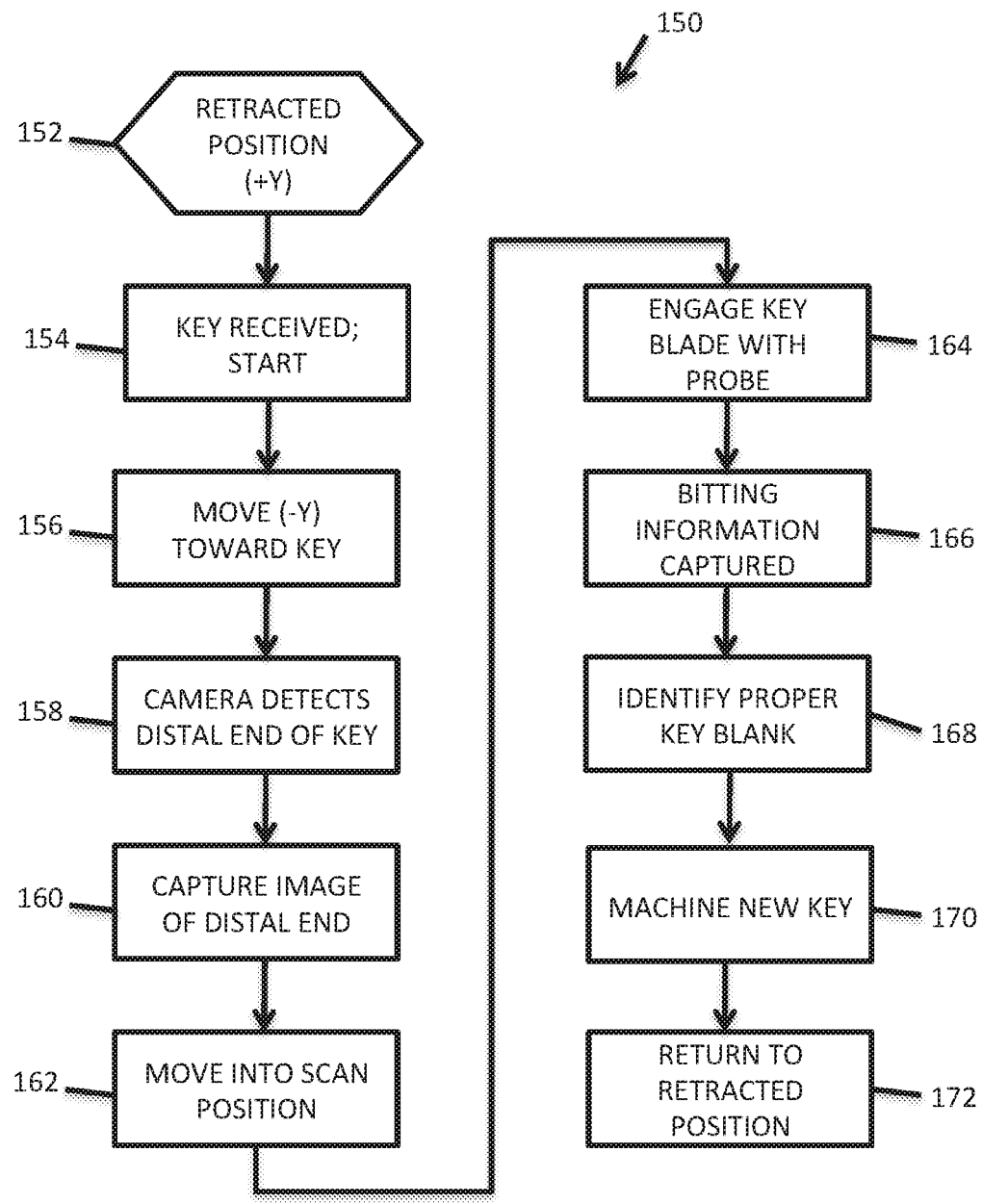
FIG. 6 is a flowchart representation of an exemplary alternative embodiment of a method for duplicating a master key.

FIG. 6 is a flowchart depicting an alternative exemplary process 150 for machining a duplicate of master key 2. For process 150 the system 20 described with respect to FIGS. 2, 3, and 4 is utilized. Also for this exemplary embodiment the mechanical measurement device 28 and camera 38 are mounted to moveable stage 40.

According to step 152 the moveable stage 40 is in a retracted (+Y) position along major key axis Y so that measurement device 28 is some distance from distal end 6 along +Y. According to step 154, a master key 2 is received in clamping mechanism 26 and the process 150 is started. Also according to step 154 the master key 2 is clamped by clamping mechanism 26.

According to step 156 the moveable stage is 40 translated in the −Y direction along major key axis Y. During step 156 camera 38 and associated software searches for the distal end 6 of master key 2. More specifically system 20 is searching for a Y position of moveable stage 40 at which camera 38 is able to focus on a portion of distal end 6. According to step 158 system 20 determines this Y position and moves to that position whereby camera 38 can focus on a portion of distal end 6.

According to step 160 camera 38 captures an image of the distal end 6 of master key 2. As a consequence of determining the Y position for focusing, system 20 can also compute the a Y position for the moveable stage 40 at which mechanical profiling of key blade 8 can begin. According to step 162 movable stage moves in Y whereby the mechanical measurement device is in a proper start position for profiling key blade 8. According to step 164 probe 32 moves down and engages upper surface 34 key blade 8.

According to step 166 the moveable stage 40 translates in the −Y direction whereby probe 32 follows the upper surface 34 of key blade 8. In following upper surface 34 the probe deflects along intermediate key axis Z. In response the mechanical measurement device 28 generates a signal indicative of the deflection of probe 32 which is digitized and then transmitted to the microcontroller 56 (FIG. 4). The microcontroller 56 processes the signal and sends information to computer 52 indicative of the bitting of master key 2.

According to step 168, the system 20 utilizes the image from step 160 and the bitting information to identify and select a proper key blank for duplicating master key 2. According to step 170, the system 20 utilizes the bitting information from step 166 to machine a duplicate key from the selected key blank.

According to step 172 the master key 2 is released and removed from clamping mechanism 26. Also as part of step 172 the mechanical measurement device 28 is moved in the +Y direction and back to the home position according to initial condition 152.

The specific embodiments and applications thereof described above are for illustrative purposes only and do not preclude modifications and variations encompassed by the scope of the following claims.

What we claim is:

1. A system for duplicating a master key comprising:
a clamping mechanism for receiving and positioning a master key whereby the master key defines a major key axis, an intermediate key axis along which a key blade variably extends, the key blade having an upper surface, and a minor key axis along a key thickness;
a mechanical measurement device including a probe that deflects along the intermediate key axis during a measurement process;
a movement mechanism that imparts relative motion along the major key axis between the mechanical measurement device and the master key whereby the mechanical probe follows the upper surface of the key blade and the mechanical measurement device generates a signal indicative of the deflection of the probe;
one or more processors that receive the signal and generate information usable for defining the machining of a duplicate key; and
a camera attached to the movement mechanism and configured to receive an image of a distal end of the master key, wherein the one or more processors utilize information from the camera to align the movement mechanism along the major key axis.

2. The system of claim 1 wherein the clamping mechanism holds the master key in a fixed location whereby the relative motion is a result of motion of the mechanical measurement device along the major key axis.

3. The system of claim 1 wherein the movement mechanism is a moveable stage configured to move linearly along the major key axis, the mechanical measurement device is affixed to the moveable stage whereby linear motion of the moveable stage imparts the relative motion.

4. The system of claim 1, wherein the one or more processors are further configured to utilize the information to align the camera to a distal end of the master key along the major key axis.

5. The system of claim 1 wherein the mechanical measurement device includes a linear variable differential transformer (LVDT).

6. The system of claim 1 wherein the mechanical measurement device is stationary and the relative motion is imparted by motion of the clamping mechanism along the major key axis.

7. A method of duplicating a master key comprising:
receiving and clamping a master key defining a major key axis, an intermediate key axis along which a key blade variably extends, and a minor key axis that defines a key thickness;
imparting relative motion along the major key axis between a mechanical measurement device with a mechanical probe and the master key whereby the mechanical probe moves along the intermediate key axis while following an upper surface of the key blade, wherein the relative motion is imparted by a moveable stage that supports and transports the mechanical measurement device while moving along the major key axis;
the mechanical measurement device generating a signal indicative of the extension of the key blade along the intermediate key axis; and
a processor receiving the signal and generating information usable for defining the machining of a duplicate key;
wherein a camera is attached to the moveable stage and further comprising the camera detecting a distal end of the master key to align the mechanical probe to the key blade along the major key axis.

8. The method of claim 7 wherein the master key remains stationary in a clamped state while the relative motion results from the mechanical measurement device moving along the major key axis.

9. The method of claim 7, further comprising computing an alignment of the camera to the distal end of the master key based upon analyzing the information from the processor.

10. A system for duplicating a master key comprising:
a clamping mechanism tor receiving and positioning a master key whereby the master key defines a major key axis, an intermediate key axis along which a key blade variably extends, the key blade defining an upper surface, and a minor key axis along a key thickness;
an image capture system for generating image information indicative of a keyway geometry for the master key;
a mechanical measurement system for mechanically profiling the key blade and generating bitting information for the master key; and
a computer that receives information generated by the image capture system and the mechanical measurement mechanism, the computer computes bitting information based upon the information from the mechanical measurement mechanism, the computer selects a proper key blank based at least upon the image information;
wherein the computer aligns the mechanical measurement system to the master key based upon the information received from the image capture system.

11. The system of claim 10 wherein the mechanical measurement system includes a mechanical measurement device including a probe that deflects along the intermediate key axis.

12. The system of claim 11 wherein the mechanical measurement system includes a movement mechanism that transports the mechanical measurement device along the major key axis whereby the probe follows the upper surface of the key blade, the information received by the computer from the mechanical measurement system is based upon the deflection of the probe over the upper surface.

13. The system of claim 10 wherein the computer aligns the image capture system to a distal end of the master key based upon the information received from the mechanical measurement system.

14. The system of claim 10 wherein the computer selects a proper key blank based upon the image information and the bitting information.

15. The system of claim 10 wherein the computer controls machining of the selected key blank based upon the bitting information.

* * * * *